April 1, 1958 W. S. SARGENT 2,828,572
FISHING LURE
Filed Jan. 18, 1954
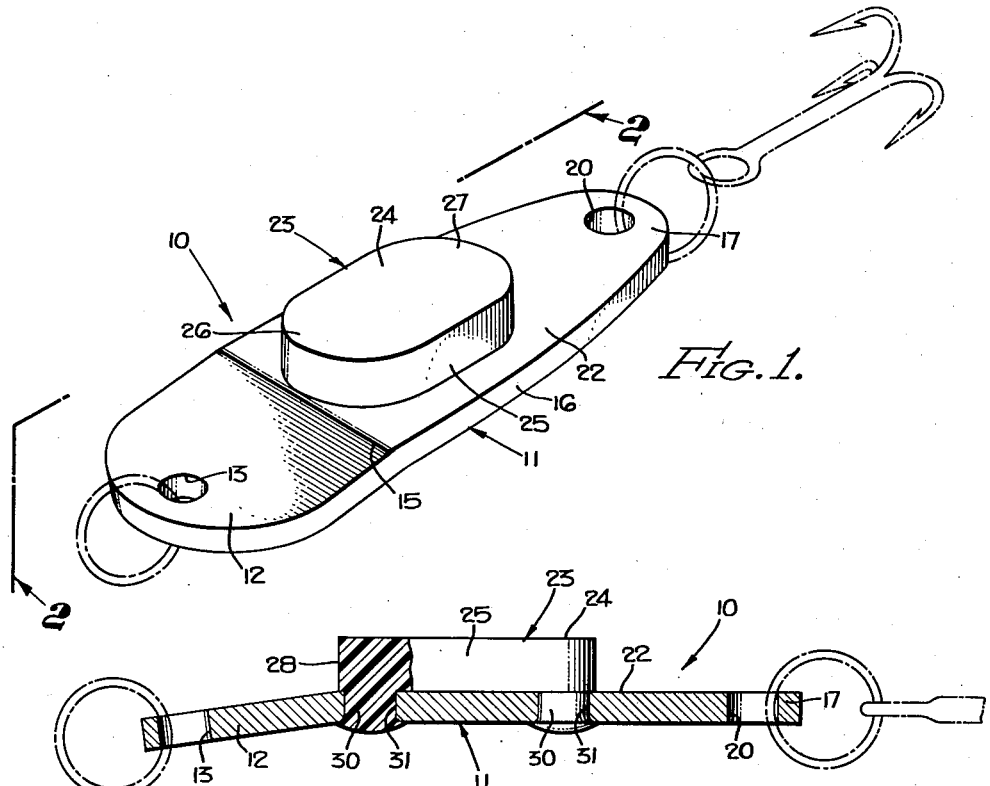
Fig.1.
Fig.2.
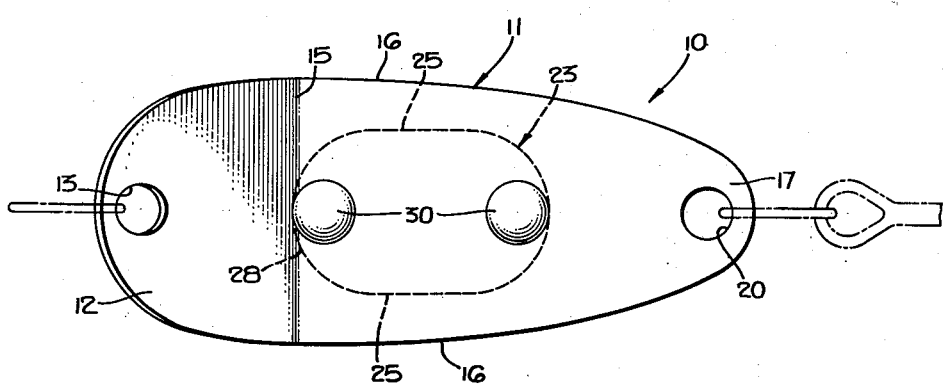
Fig.3.
WILFRED S. SARGENT,
INVENTOR.
BY
ATTORNEYS

United States Patent Office 2,828,572
Patented Apr. 1, 1958

2,828,572

FISHING LURE

Wilfred S. Sargent, Puente, Calif., assignor to Under-Wonder Company, Whittier, Calif., a copartnership consisting of Wilfred S. Sargent and Theodore Mooschelsian Application January 18, 1954, Serial No. 404,666

3 Claims. (Cl. 43—42.39)

This invention relates to fishing equipment and has particular reference to a fishing lure.

One of the principal objects of this invention is to provide a novel and improved fishing lure.

Another object of this invention is to provide a fishing lure which, when being retrieved or when used in trolling, closely simulates the swimming action of live bait such as a minnow or the like, the lure being responsive to variations in retrieving or trolling speed whereby the action of the lure may be controlled as desired.

Another object of this invention is to provide a fishing lure which combines the functions of bait and sinkers or other weights.

Yet another object of this invention is to provide a fishing lure which is extremely simple in design and which is adapted to be produced economically on a quantity basis.

Other objects and advantages of this invention it is believed will be readily apparent from the following detailed description of a preferred embodiment thereof when read in connection with the accompanying drawings.

In the drawings:

Figure 1 is a perspective view of a fishing lure constructed in accordance with this invention.

Figure 2 is a sectional elevation taken substantially on the line 2—2 of Figure 1.

Figure 3 is a bottom plan view of the lure.

Referring now to the drawings, the fishing lure of this invention is generally indicated 10 and includes a relatively thin, elongated body member 11 having a rounded front or nose portion 12 provided with an aperture 13 for the reception of a ring (shown in phantom lines) or other means for attachment of the lure to a fishing line. As shown best in Figures 1 and 2 the nose portion 12 is inclined downwardly at an angle from the body member proper, the body member being bent along a transverse line 15 forming the vertex of the angle. The sides 16 of the body member taper gradually from the line 15 in directions towards a plane perpendicular to the body member and intersecting the longitudinal center line thereof, terminating in a rounded rear portion 17. An aperture 20 is provided in the rear portion 17 for the reception of a ring (shown in phantom lines) to which is attached a conventional fish hook.

Mounted on the planar top face 22 of the main portion of the body member is a stabilizer member 23 preferably formed of a plastic material. As shown, the stabilizer member is relatively thick, having a planar top 24, parallel sides 25 and rounded front and back portions 26 and 27, the front edge 28 being positioned on the line 15. In order to provide a clean, unbroken appearance, the stabilizer member is molded with a pair of pin elements 30 extending downwardly from the bottom thereof, the pin elements extending through countersunk holes 31 in the body member and deformed in the manner of rivets to securely connect the stabilizer and body members. The deformation is preferably accomplished by a thermal pressure operation.

The fish lure of this invention has been found to very closely simulate the swimming movement of a small fish when it is being retrieved or used in trolling. As it moves through the water the lure describes a combination of three actions or movements: (1) a wobbling pivotal action of less than 90 and more than 45 degrees in both directions about the longitudinal center line of the lure; (2) a sporadic darting away for distances of up to eight inches from the straight retrieving or trolling line; and (3) a "swimming action" represented by a side-to-side pivotal movement in a horizontal plane, most noticeable in the rear end of the lure. While these three basic movements take place at all times during retrieving or trolling, the individual movements may be accentuated by proper manipulation of the fishing tackle. Action (1) above is emphasized by a slow retrieving or trolling speed, action (2) is at a maximum at medium speeds when the rod is intermittently twitched, and action (3) is accentuated at high speeds of retrieving or trolling.

It has been found that in order to obtain the above-described movements of the lure, the angle of inclination of the nose portion is extremely critical and must be maintained within the limits of from about 7 to about 9 degrees from the plane of the body member proper. Preferably, the line 15 is spaced approximately one-third of the length of the body member from the front edge thereof. It is necessary that the stabilizer member have a weight less than that of the body member and preferably it is formed of a material having a specific gravity or density less than that of the body member. Thus, the stabilizer is molded of plastic, as indicated, and the body member is of metal such as brass. The relative thicknesses of the stabilizer and body member have been found to be important considerations in proper design of the lure. Thus, it has been found that the thickness of the stabilizer member should be not less than 1½ times nor more than 3 times the thickness of the body member. It has also been found that the stabilizer member should have a planar top and sides extending downwardly therefrom at right angles thereto. The preferred dimensions of the lure are as follows: overall length, 1.4 inches; width, ½ inch; thickness of body member, 0.050 inch; length, width and thickness of stabilizer member, ½ inch, 5/16 inch and 0.100 inch respectively.

The taper of the body member in a direction toward the hook is another important feature of the structure of the lure in that it increases the hooking ability of the lure when a fish approaches from the front or the side, decreasing the possibility of the fish striking the body member before the hook is encountered.

While a specific embodiment of this invention has been shown and described, it is not intended to limit the same to the exact details of the construction set forth, and it embraces such changes, modifications and equivalents of the parts and their formation and arrangement as come within the purview of the appended claims.

I claim:

1. A fishing lure comprising the combination of a relatively thin, elongated body member having a main portion with planar, mutually parallel top and bottom faces, and a front portion inclined at an angle from the plane of said main portion, said angle being from about 7 to about 9 degrees; and a stabilizer member secured to said body member on the top side thereof, said stabilizer member having a weight less than that of said body member and a thickness greater than that of said body member, the top of said stabilizer member being planar and parallel to said top and bottom faces, and the sides thereof being perpendicular to said stabilizer member top, 2. A fishing lure comprising the combination of a relatively thin, elongated body member having a main portion with planar, mutually parallel top and bottom faces, and a front portion inclined at an angle from the plane of said main portion, said angle being from about 7 to about 9 degrees, the sides of said body member tapering from said front portion in directions toward a plane perpendicular to said top and bottom faces and intersecting the longitudinal center line of said body member; and a stabilizer member secured to said body member on the top side thereof, said stabilizer member having a weight less than that of said body member and a thickness greater than that of said body member, the top of said stabilizer member being planar and parallel to said top and bottom faces, and the sides thereof being perpendicular to said stabilizer member top.

3. A fishing lure comprising the combination of a relatively thin, elongated body member having a main portion with planar, mutually parallel top and bottom faces, and a front portion inclined at an angle from the plane of said main portion, said angle being from about 7 to about 9 degrees; and a stabilizer member secured to said body member on the top side thereof, said stabilizer member having a weight less than that of said body member, the thickness of said stabilizer member being from about 1½ times to about 3 times the thickness of said body member.

References Cited in the file of this patent

UNITED STATES PATENTS

| | | |
|---|---|---|
| 1,546,673 | Poulsen | July 21, 1925 |
| 1,778,214 | Fisher | Oct. 14, 1930 |
| 1,809,663 | Allen | June 9, 1931 |
| 2,251,593 | Mangle | Aug. 5, 1941 |
| 2,575,626 | Isaac | Nov. 20, 1951 |
| 2,589,117 | Oberbeck et al. | Mar. 11, 1952 |
| 2,680,320 | Rothbard | June 8, 1954 |
| 2,758,408 | Murphy et al. | Aug. 14, 1956 |

FOREIGN PATENTS

| | | |
|---|---|---|
| 472,932 | Canada | Apr. 17, 1951 |